United States Patent
Warner et al.

(10) Patent No.: US 9,489,308 B2
(45) Date of Patent: Nov. 8, 2016

(54) CACHE LINE EVICTION BASED ON WRITE COUNT

(75) Inventors: Craig Warner, Irving, TX (US); Gary Gostin, Plano, TX (US); Matthew D Pickett, San Francisco, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/387,554

(22) PCT Filed: Apr. 27, 2012

(86) PCT No.: PCT/US2012/035440
§ 371 (c)(1),
(2), (4) Date: Sep. 24, 2014

(87) PCT Pub. No.: WO2013/162594
PCT Pub. Date: Oct. 31, 2013

(65) Prior Publication Data
US 2015/0081982 A1    Mar. 19, 2015

(51) Int. Cl.
G06F 12/00 (2006.01)
G06F 13/00 (2006.01)
G06F 12/08 (2016.01)
G06F 13/16 (2006.01)
G06F 12/02 (2006.01)
G06F 12/12 (2016.01)

(52) U.S. Cl.
CPC ....... *G06F 12/0833* (2013.01); *G06F 12/0238* (2013.01); *G06F 12/0866* (2013.01); *G06F 12/122* (2013.01); *G06F 13/1673* (2013.01); *G06F 2212/1036* (2013.01); *G06F 2212/312* (2013.01); *G06F 2212/621* (2013.01); *G06F 2212/69* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 9,292,451 B2 * | 3/2016 | Dong | ................. G06F 12/0891 |
| 2008/0209112 A1 | 8/2008 | Yu et al. | |
| 2008/0229003 A1 | 9/2008 | Mizushima et al. | |
| 2008/0235443 A1 | 9/2008 | Chow et al. | |
| 2008/0301256 A1 * | 12/2008 | McWilliams | ....... G06F 12/0284 709/214 |
| 2010/0017650 A1 * | 1/2010 | Chin | ...................... G06F 13/28 714/6.12 |
| 2010/0318879 A1 | 12/2010 | Yu | |

(Continued)

FOREIGN PATENT DOCUMENTS

| | | |
|---|---|---|
| CN | 102012867 | 4/2011 |
| WO | WO-2011112523 | 9/2011 |

OTHER PUBLICATIONS

International Searching Authority, The International Search Report and the Written Opinion, Jan. 2, 2013, 14 Pages.

(Continued)

*Primary Examiner* — Sean D Rossiter
(74) *Attorney, Agent, or Firm* — Fabian VanCott (57) ABSTRACT

A method of shielding a memory device (110) from high write rates comprising receiving instructions to write data at a memory container (105), the memory controller (105) composing a cache (120) comprising a number of cache lines defining stored data, with the memory controller (105), updating a cache line in response to a write hit in the cache (120), and with the memory controller (105), executing the instruction to write data in response to a cache miss to a cache line within the cache (120) in which the memory controller (105) prioritizes for writing to the cache (120) over writing to the memory device (110).

11 Claims, 7 Drawing Sheets

(56) References Cited

U.S. PATENT DOCUMENTS

| | | | |
|---|---|---|---|
| 2011/0055458 A1* | 3/2011 | Kuehne | G06F 12/0246 |
| | | | 711/103 |
| 2011/0119456 A1 | 5/2011 | Ipek et al. | |
| 2011/0138105 A1 | 6/2011 | Franceschini et al. | |
| 2012/0007038 A1* | 1/2012 | Strukov | H01L 27/0207 |
| | | | 257/5 |
| 2012/0030434 A1 | 2/2012 | Nickel et al. | |
| 2012/0047332 A1* | 2/2012 | Bannon | G06F 12/0804 |
| | | | 711/135 |
| 2012/0311228 A1* | 12/2012 | Hsu | G06F 12/0246 |
| | | | 711/102 |

OTHER PUBLICATIONS

Roberts, D.A., Efficient Data Center Architectures Using Non-volatile Memory and Reliability Techniques, (Research Paper), 2011, 170 pages, http://web.eecs.umich.edu/~tnm/trev_test/dissertationsPDF/daveR-ref-fixed.pd.

Shadaram, A. et al., A One-memristor Cell Implementation of a Non-volatile Memory System, (Research Paper), Canadian Journal on Electrical and Electronics Engineering, Jul. 2011, vol. 2, No. 7, 7 Pages, http://www.ampublisher.com/july%202011/EEE-1107-034-One-Memristor-Cell%20-Implementation-Non-Volatile-Memory-System.pdf.

* cited by examiner

CACHE LINE EVICTION BASED ON WRITE COUNT

BACKGROUND

Computer memory is used in computer systems to store, at least temporarily information which may be retrieved by a processor for later use. A computer memory may have some physical material onto which information is stored so the form of binary digits represented by a 0 or 1. The physical material in some memory devices are broken into sections called memory cells. Some cells may include a binary digit that is occasionally switched from one binary digit to another, i.e. 1 to 0 or 0 to 1. However, other cells may be switched relatively more often that most cells within the memory and the physical structure of those cells may become degraded over time. The degradation of the memory cells of the computer memory may cause the cells to be defective due to the switching and rewriting process. Consequently, data may be lost or incorrectly stored at a cell within the memory.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Various types of memory devices may be used in a computing system. One concern, as described above is the ability for a computer memory device to withstand a number of switches from one binary digit to another before the memory cells being switched from defective. The value set to the ability of a single memory cell to be switched is often referred to as the endurance value. This value can sometimes be as high as $10^{16}$ switches or higher in some memory devices.

Dynamic random-access memory (DRAM), for example, is one type of memory device that may be used for main memory because its speed and density as well as its endurance. However, DRAM memory devices have physical limitations. For example, in the relatively near future, DRAM manufacturers are expected to begin stacking dice since planar scaling of a DRAM is expected to end. Nevertheless, customers will continue to demand increased memory per package. Die stacking is a method that has been proposed in which layers of DRAM memory may be stacked one on another vertically. However die stacking is costly and may not be the best solution.

Spin torque transfer (STT) and phase change memory (PCM) are other typos of memory devices. However, both STT and PCM cannot scale beyond DRAM density because they both require a rather large (100×100 nm2) silicon access transistor which eliminates the ability to use on-die crossbar stacking.

Yet another type of a memory device that can be used in a comparing system is a memristive device. Memristive devices are described in U.S. Patent App. Pub. No. 2008/0079029, entitled "Multi-terminal Electrically Actuated Switch" and U.S. Patent Application Publication No. 2008/009033, entitled "Electrically Actuated Switch", both to R. Stanley Williams, which are hereby incorporated by reference in their entireties. A memristor is a passive two-terminal electrical component that when current flows in one direction through the device, the electrical resistance increases; and when current flows in the opposite direction, the resistance decreases. Additionally, when the current is stopped, the component retains the last resistance that it had, and when the flow of charge starts again, the resistance of the circuit will be what it was when it was last active. It is these resistive states which may be used by the memristive device to store data. Currently, the endurance of memristors are not yet at the level of DRAM or STT, however, the density of a memristive device may be as much as four times the amount of a DRAM device.

The present specification describes a method of shielding a memory device from high write rates comprising receiving instructions to write data at a memory controller, the memory controller comprising a cache comprising a number of cache lines defining stored data; with the memory controller, updating a cache line in response to a write hit in the cache; and with the memory controller, executing the instruction to write data in response to a cache miss to a cache line within the cache in which the memory controller prioritizes for writing to the cache over writing to the memory device.

The present specifications further describes a system for shielding a memory device from a number of write processes, comprising a memory controller, a memory device communicatively coupled to the memory controller; and a write shielding cache communicatively coupled to the memory controller and memory device, in which the memory controller receives a write data request from a processor and responsive to a write hit in the write shielding cache, updating a cache line in the write shielding cache; responsive to a cache miss to a cache line within the write shielding cache, writing data to the a cache line in the write shielding cache; and in which, writing data to the a cache line in the write shielding cache comprises writing an evicted cache line from the write shielding cache to the memory device.

As used to the present specification and in the appended claims, the term "memory device" or "memory" may be broadly interpreted as any type of device that can store data.

Some examples of a memory device may include a memristive device, a hard disk drive (HDD), a random-access memory (RAM) device, a read-only memory (ROM) device, a flash memory device, and any other volatile or non-volatile memory device.

Additionally, as used in the present specification and in the appended claims, the term "endurance value" is mean to be understood broadly as a value given to a memory device which describes how many times the memory device, and specifically a memory cell within the memory device, can be written to. As discussed above, the various memory devices may have a range of endurance values that may be as high as $10^{16}$ or even higher.

Still further, in the present specification and in the appended claims, the term "initial cache line," "initial line," or "hot cache lines" is meant to be understood broadly as a line of memory within a memory device that is used first, by a computer system and may be subjected to a disproportionally higher number of write processes than other memory lines by the memory device.

In the following description, for purposes of explanation, numerous specific details are set forth in order to provide a thorough understanding of the present systems and methods. It will be apparent, however, to one skilled in the art that the present apparatus, systems and methods may be practiced without those specific details. Reference in the specification to "an example" or similar language indicates that a particular feature, structure, or characteristic described in connection with that example is included as described, hot may not be included in other examples.

Figure 1:
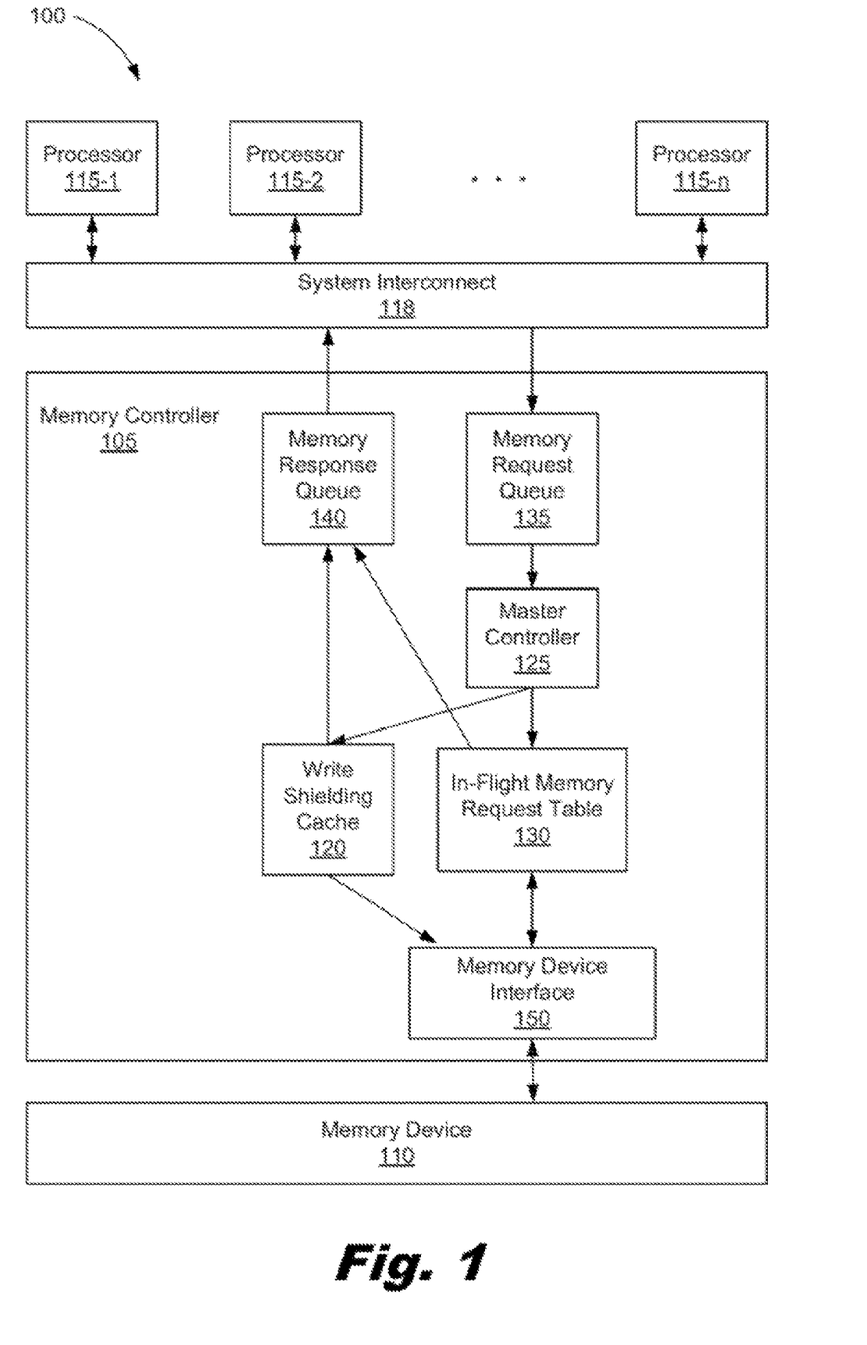
FIG. 1 is a block diagram of a memory endurance system according to one example of the principles described herein.

FIG. 1 is a block diagram of a memory endurance system (110) according to one example of principles described herein. The system (100) may include a memory controller (105), a memory device (110) communicatively coupled to the memory controller (105), and a number of processors (115-1, 115-2, 115-n) communicatively coupled to the memory controller (105) via a system, interconnect (118) such as a system bus.

The processors (115-1, 115-2, 115-n) may be any type of processor which is capable of processing data from programmed instructions as well as directing other hardware devices within the system (100) to read from or write to memory. In one example, any number of processors may be used with the system (100). In the example shown in FIG. 1, the processors (115-1, 115-2, 115-n) may be connected to the memory (110) via the memory controller (105) and the individual hardware devices of the memory controller (105).

The memory device (110) may be any type of memory as dismissed above. Therefore, the memory device may be, for example, a volatile memory device such as a random-access memory (RAM), a dynamic random-access memory (DRAM) device, static random-access memory (SRAM) device, a thyristor random-access memory (T-RAM)) device, a zero-capacitor random-access memory (Z-RAM) device, or a twin transistor random-access memory device (TTRAM). The memory device may also be a non-volatile memory device such as a read-only memory device (mask ROM, PROM, EPROM, EEPROM) or a non-volatile ransom-access memory device (i.e. flash memory). In one example, the memory device is a memristive device.

Although the memory device (110) may possibly be a number of different volatile and non-volatile memory devices each device may store a number of bits in sequence a certain locations within the device. In one example, the bits may form a number of cache lines within the memory. In this example, the smallest unit of memory that is read or written to the memory device (110) may be a cache line comprising a set number of bits. In one example, the number of bits is sixty-four. In another example the number of bits is 512. During the reading a writing process, certain memory lines within the memory device (110) may be utilized relatively more often than others. These initially used memory lines may be referred to as hot cache lines because they are subjected to degradation at a quicker rate than other cache lines within the memory device (110). The memory controller (105), along with a write shielding cache (120), may serve to protect and minimize the degradation of the cache lines within the memory device.

The memory controller (105) may comprise a write shielding cache (120), a master controller (125), and an in flight memory request table (130). Other devices or programs on the memory controller (105) may include a memory request queue (135), a memory response queue (140) and a memory device interface (150). Each of these will now be described in more detail.

The memory request queue (135) stores information specific to memory requests destined for the memory device (110). Requests within the memory request, queue are stored in the order in which they are received from the number of processors (115-1, 115-2, 115-n). Some of the information stored within memory request queue (135) may be addresses as well as the type of request being solicited (i.e., whether the request is to memory (110) or a peripheral device, or is a read request or a write request).

The memory response queue (140) receives read response signals and write response signals from the write shielding cache (120). The read response signals may include read data signals as well as read status signals that identify the read request corresponding to the read data. The write response signals may include write status signals that identify a write request that has been serviced by the devices within the memory controller (105) and more specifically, the write shielding cache (120). The memory response queue (140) stores the memory response signals in the order they are received for delivery to any of the processors (115-1, 115-1, 115-n).

The memory controller (105) also includes a memory devise interface (150). The memory device interface (150) may communicate with the memory devices (110) such as a memristive device. Specifically, the memory device interface (150) may enable data transfers between the devices of the memory controller (105) and the memory device (110) allowing the memory controller (105) the ability to read from and write to the memory device (110).

The master controller (125) receives memory requests from the memory request queue (135) and addresses the requests by forwarding them onto the write shielding cache (120). In one example, the master controller receives the memory requests from the memory request queue (135) in a first in, first out scenario.

The write shielding cache (120), as briefly discussed above, may maintain a number of cache lines defining data that may be accessed relatively more often than other cache lines saved in other locations such as the memory device (110). The write shielding cache (120) may be a fully associative write-back cache with a Least Recently Used (LRU) replacement policy that acts as a buffer between the processors (115-1, 115-2, 115-n) and the memory device (110).

When a write hits in the write shielding cache (120), the write shielding cache (120) itself is updated instead of being written to the memory device (110). Writes that miss the write shielding cache (120) will be written to either an unused entry or the LRU entry in the cache. When the write is written to the LRU entry in the write shielding cache (120), any evicted line will be written to the memory device (110). An N-line write shielding cache (120) provides an N+1 times redaction in the maximum write rate to individual lines in the memory device (110). Therefore, for example, a write shielding cache (120) of 100 to 1000 cache entries is relatively more easily implementable inside the memory controller (105), and may provide 2 to 3 orders of magnitude reduction in maximum write rate to the memory device (110) respectively. This becomes especially helpful when a small set of hot cache lines within the memory device (110) are written to relatively more often than other lines in circumstances such as where the system (100) uses semaphores or bcopy-like routines.

Figure 2:
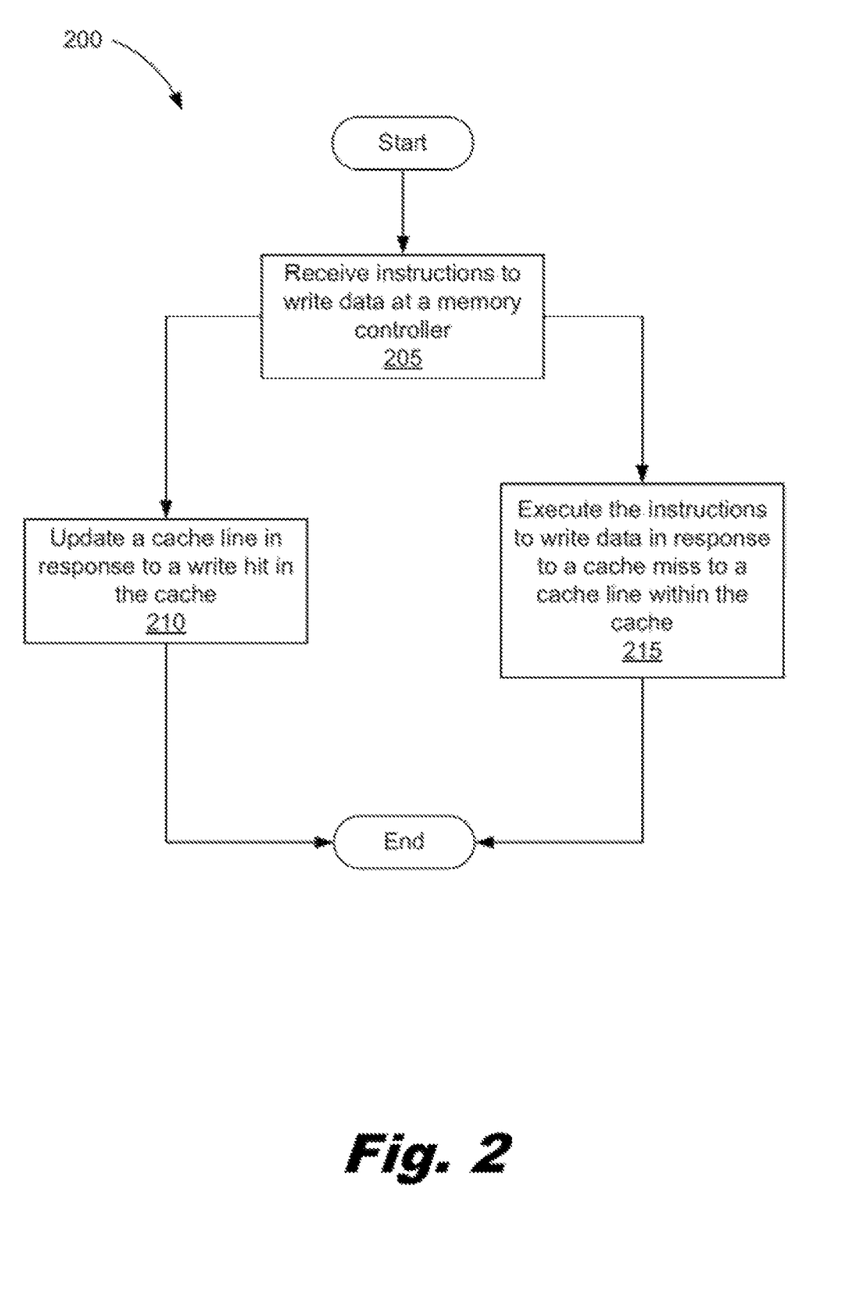
FIG. 2 is a flowchart allowing a method of shielding a memory device from high write rates according to one example of the principles described herein.

Turning now to FIG. 2, a flowchart showing a method (200) of shielding a memory device (110) from high write rates is shown according to one example of principles described herein. The method may begin with the master controller (125) receiving (block 205) instructions to write data at a memory controller (105). The instructions may be received at a memory request queue (135) and, according to a first in first out routine, be sent to a master controller (125). The master controller (125) may search the write shielding cache (120). When a write hits in the write shielding cache (120), the write shielding cache (120) itself is updated (block 210) by the memory controller (105) in response to that write hit. The data is not written to the memory device (110) preventing the memory device (110) from being subjected to another write process.

In response to a cache miss to a cache line within the write shielding cache (120), the memory controller (105) may execute (block 215) the instructions to write data to the write shielding cache (120). The data may be written to the write shielding cache (120) ether in an unused entry within the write shielding cache (120) or to an Least Recently Used (LRU) cache line in the write shielding cache (120). As discussed above, when the LRU cache line is written to, the write shielding cache (120) may direct the evicted cache line to be written to the memory device (110).

In the one example, the system (100) may use a number of spare lines within the memory device (110) as substitutes for a number of initial lines when those initial lines approach a maximum number of writes. In this example, these spare lines may be set aside in a spare line pool and made inaccessible by any device in the memory controller (105) until it baa been determined that at least one initial line is approaching its maximum number of writes. The initial lines may be referred to as hot lines because they ore most often written to and consequently subjected to degradation at a quicker rate than other cache lines within the memory device (110). This is especially true where the system (100) uses semaphores or bcopy-like routines.

During each write process on the memory device (110) the memory controller (105) may lay down 64 bytes of data in a cache line. In addition to the 64 bytes of data, another 48 bits of data may be laid down as well which are associated with the first 64 bytes and serve as a counter. The counter describes the number of times data has been written that data line. As a result, every time that line is written to, the memory controller (105) first reads from the line the count and than writes over that memory ilea with the new data. The counter written with the new data may indicate that that fine has been written to one mare time. This process may continue by incrementally adding one more write count to the counter until a threshold number of write counts has been reached.

The threshold number of write counts may be a maximum number of times that a line within the memory device (110) may be written to before the physical structure of the memory device at that physical location Pas degraded to the point where it may not be trusted to retain data. For example, some data devices may structurally be able to withstand about $10^9$ write processes before any one memory line becomes degraded. As the number of writes times to any one line approaches that number (i.e. $10^9$) the chances of a write process failing or data being lost may increase. To prevent data loss or failure of the data line, the master controller (105) determines when this number is reached and alters the physical layout of where data is stored from then on.

Therefore, once an initial line has reached a certain predetermined threshold of maximum number of writes, the memory controller (105) may direct an address of a spare line and a redirection flag to be put into the data field of the initial line. Thereafter, any subsequent reads of the initial line will detect the redirection flag and trigger a read of the new line where the data is stored.

Therefore, in the example above, if there is an idle entry in the write shielding cache (120), the new write line will be written into the cache along with its write count from memory device (110). However, if all entries of the write shielding cache (120) are currently in use, the write counts of all N lines plus the new line will be compared. In one example, of the N+1 lines, the line win the lowest write count will be written to the memory device (110) with an incremented write count. The N other lines will be retained in the write shielding cache (120). In another example, least recently used (LRU) scheme may be implemented to add and evict cache lines in the write shielding cache (120). In this example, the least recently used cache line will be evicted to make room for the new line to be added to the write shielding cache (120).

When the 48 bit write counter for a line approaches the threshold maximum number of writes supported by the type of memory device (110) used, a new line is removed from the spare line pool. The address of the spare line is put into the data field, a redirection flag (stored alongside the data field) is set, and both are written into the initial line. Subsequent reads of the initial line will detect the redirection flag, triggering a read of the new line.

In one example, if and when the new line wears out, a newer line may be removed from the spare pool, and the initial line pointer is updated to trigger a read of the newer line. In another example, when the newer line reaches the same or similar threshold number of maximum writes, another new line from the spare line pool may be used. In this example, a redirection flag (stored alongside the data field) may be set and both may be written into the previously new line thereby forming a chain of degraded lines leading to a new line from the spare line pool.

Figure 3:
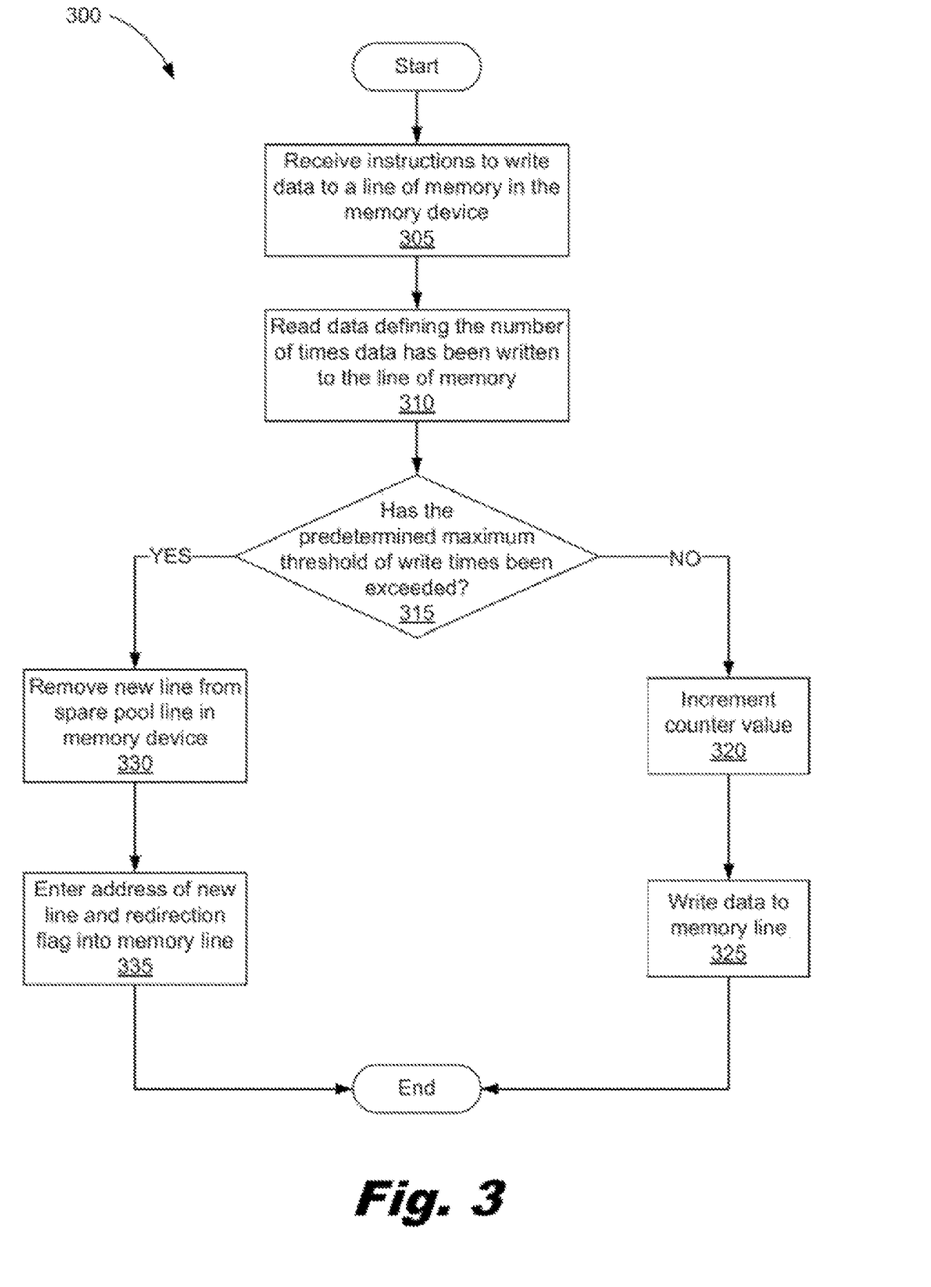
FIG. 3 is a flowchart showing a method of substituting a number of memory lines within a memory device for other lines in the memory device after receiving a write command to the memory device according to one example of the principles described herein.

Referring to FIG. 3, a flowchart showing a method of substituting a number of memory lines within a memory device (110) for other lines in the memory device (110) after receiving a write command to the memory device (110) is shown according to one example of the principles described herein. After a write command has been completed in the write shielding cache (120) as discussed in FIG. 2, the instructions are received (block 305) to write the evicted cache line to the memory device (110). As discussed above, in one example this evicted cache line may be the cache line with the lowest write count pursuant to the Least Recently Used (LRU) replacement policy.

The method may continue with the memory controller (105) reading (block 310) from a memory line in the memory devise (110) the data defining the number of times data has been written to that line of the memory. The memory controller (105) may then determine (block 315) if the number of times that data has been written to that memory line has exceeded a predetermined maximum threshold. If the predetermined maximum threshold of write times has not been exceeded (NO determination, block 315), the counter value is incremented (block 320) and data is written (block 325), to the memory line. In one example, incriminating the counter value may be accomplished by the memory controller (105) adding 1 to the current count.

If the predetermined maximum threshold of write times has been exceeded (YES determination, block 315), a new line is removed (block 330) from a spare pool of memory lines. The address of the spare line and a redirection flag is then entered (block 335) into the initial line. This way, a degraded, or at least nearly degraded, memory line will not be used to store data on the memory device (110) while data may still be securely stored on the memory device (110) at either locations. After the address of the spare line and a redirection flag is entered (blocks 335) into the initial line, the data may be written to the new line in the memory device (110).

In one example, the methods described in FIGS. 2 and 3 together may both be implemented on the system describe in FIG. 1. In another example, the method described in FIG. 2 only may be implemented on the system described in FIG. 1. In yet another example, the method described in FIG. 3 only may be implemented on the system described in FIG. 1.

Figure 4:
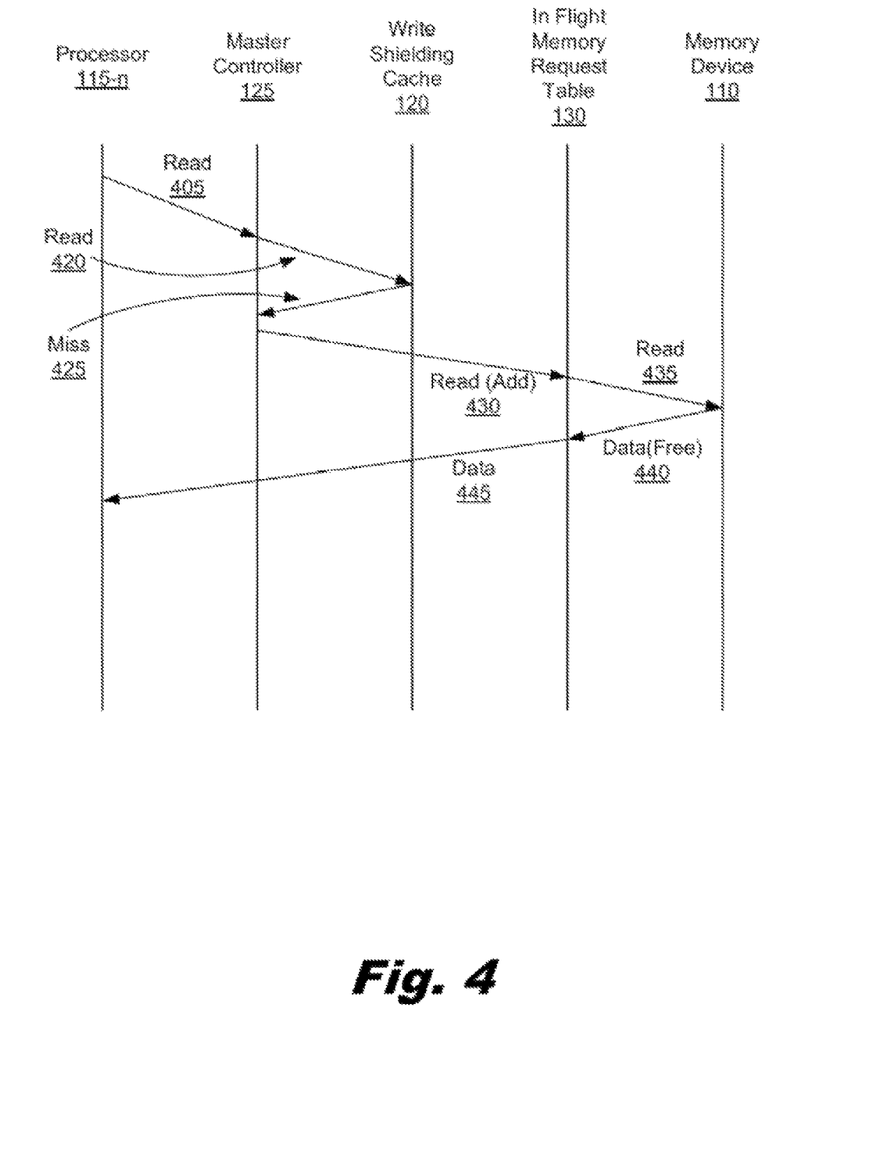
FIG. 4 is a data flow diagram of the system depicted in FIG. 1 showing a process of reading data from the system according to one example of the principles described herein.
Figure 5:
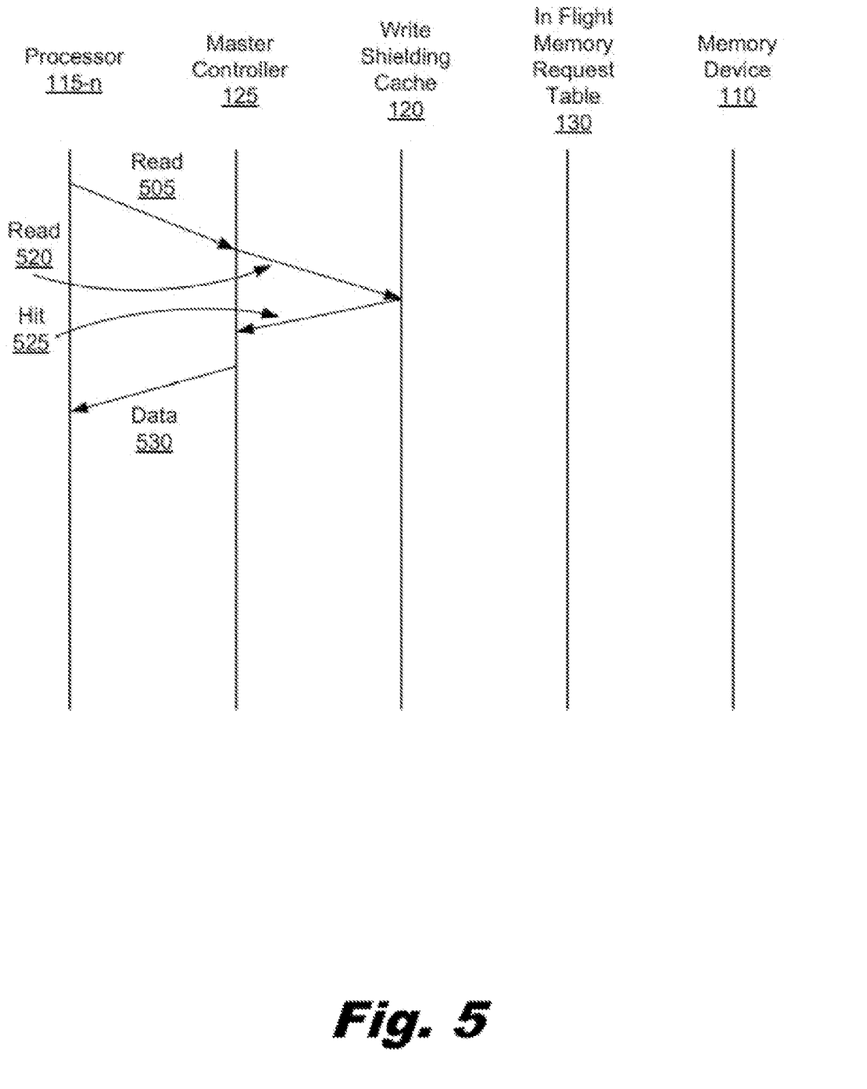
FIG. 5 is a data flow diagram of the system depicted in FIG. 1 showing another process of reading data from the system according to one example of the principles described herein.
Figure 6:
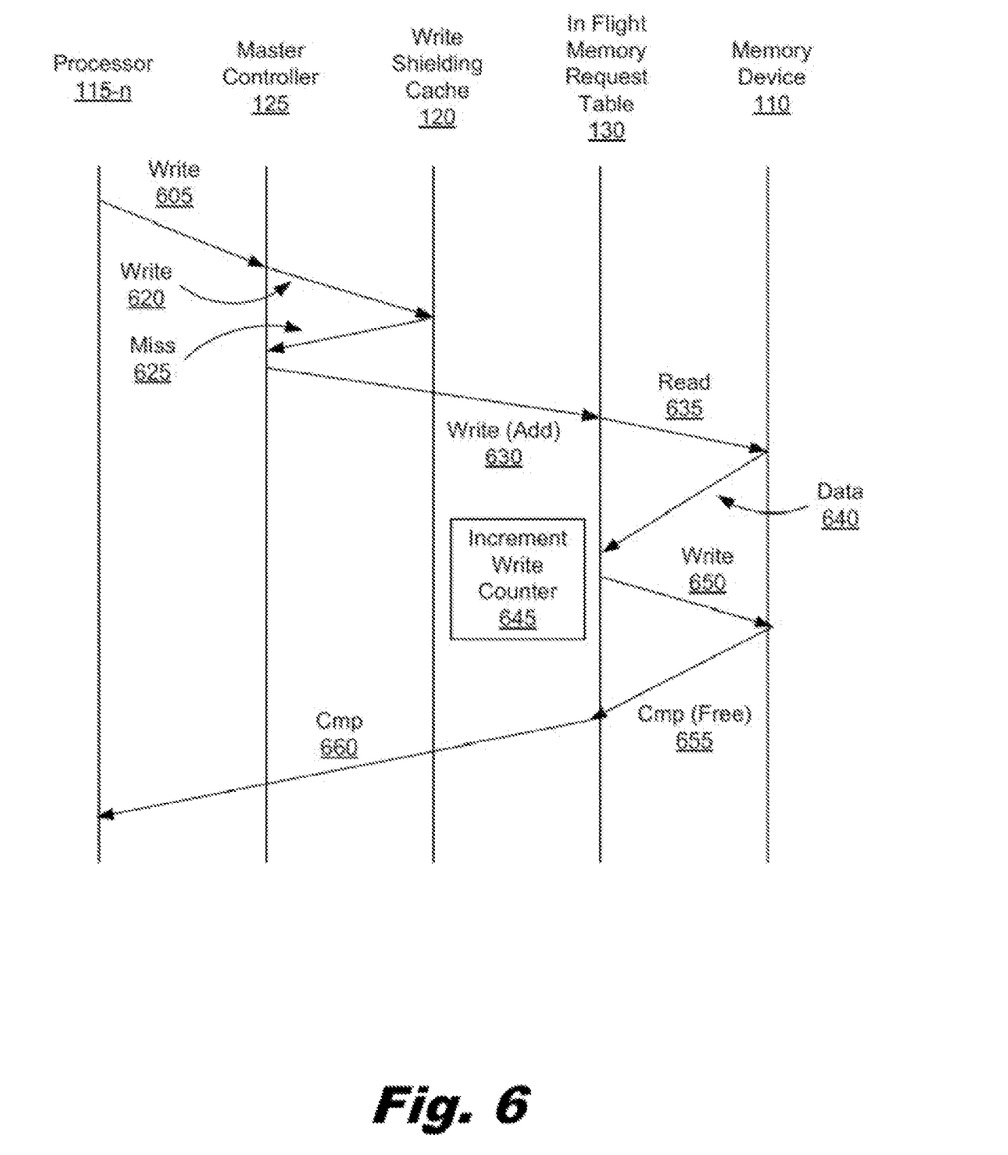
FIG. 6 is a data flow diagram of the system depicted in FIG. 1 showing a write request data flow within the system according to one example of the principles described herein.
Figure 7:
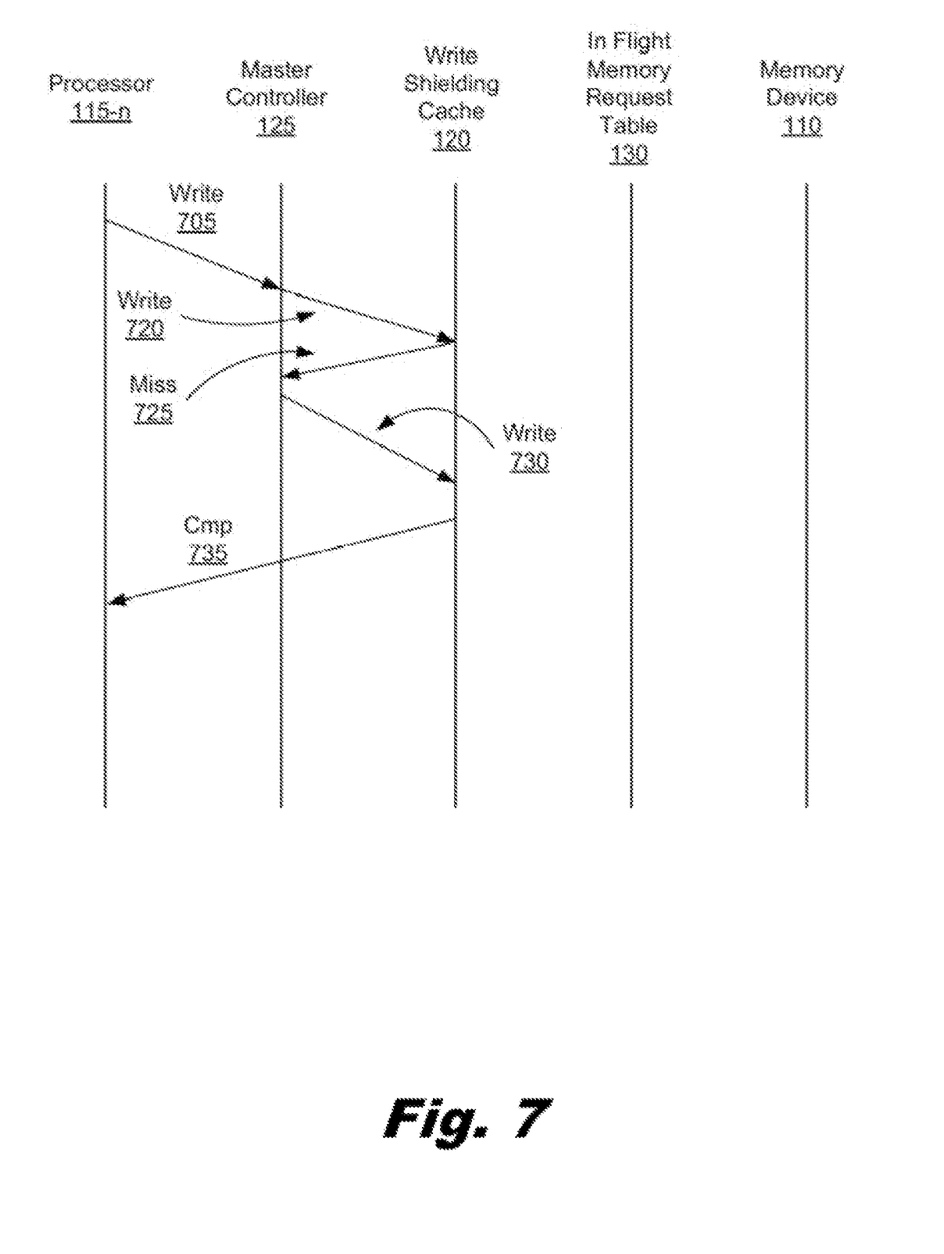
FIG. 7 is a data flow diagram of the system depicted in FIG. 1 showing another write request data flow within the system according to one example of the principles described herein.

FIGS. 4-7 show four dataflow diagrams showing various ways in which data maybe directed through the various devices of the memory controller (105). FIGS. 4 and 5 each depict a read request data flow in which the processors 115-1, 115-2, 115-n) of the system (100) request data to be read from and returned by the write shielding cache (120), the in-flight memory request table (130), and the memory device (110). FIGS. 6 and 7 each depict a write request data flow in which the processors (115-1, 115-2, 115-n) of the system (100) request certain data to be written to the write shielding cache (120) and the memory device (110). Throughout these figures, some of the devices depicted in FIG. 1 may not be discussed. However, in some examples, these devices (such as the memory devise interface (150), the memory response queue (140), memory request queue (135), and system interconnect (118)) may still be implemented as describe above.

FIG. 4 is a data flow diagram of the system depicted in FIG. 1 showing a process of reading data from the system according to one example of the principles described herein. At least one of the processors (115-1, 115-2, 115-n) of the system (100) may send a read request (405) to the master controller (125) through the memory request queue (135).

The master controller (125) may send a read request (420) to the write shielding cache (120) to determine if the write shielding cache (120) includes the data being requested by the processor (115-1, 115-2, 115-n) within one of the cache lines therein. FIG. 4 shows that a read miss (425) resulted from the request (420). This may indicate that the data relating to the original read request (405) is not located on the write shielding cache (120).

The master controller (125) then sends a read request (430) to the memory device (110) with instructions to add the request to the in-flight memory table (130). The read request (435) may then be forwarded onto the memory device (110) via the in-flight memory request table (130) upon which the data may read from the memory device (110). The processor (115-1, 115-2, 115-m) is then provided the requested data (440, 445), via the in-flight memory request table (130) where a record is created defining that the information is now free for other subsequent reads.

The data flow in FIG. 4 allows for a quicker access of memory if the information requested by the processor (115-1, 115-2, 115-n) is provided as data on the write shielding cache (120). FIG. 5 depicts such a situation. FIG. 5 is a data flow diagram of the system (100) depicted in FIG. 1 showing another process of reading data from the system according to one example of the principles described herein.

Here, at least one of the processors (115-1, 115-2, 115-n) of the system (100) may send a read request (505) to the master controller (125) through the memory request queue (135). The master controller (125) may send a read request (520) to the write shielding cache (120) to determine if the write shielding cache (120) includes the data being requested by the processor (115-1, 115-2, 115-n) is located within one of the cache lines therein. FIG. 5 shows that a read hit (525) resulted indicating that at least one cache line within the write shielding cache (120) contained the data requested by the processor (115-1, 115-2, 115-n). In this case the found data (530) may be provided to the processor (115-1, 115-2, 115-n) via the memory response queue (140) of the system (100).

FIG. 6 is a data flow diagram of the system (100) depicted in FIG. 1 showing a write request data flow within the system (100) according to one example of the principles described herein. At least one of the processors (115-1, 115-2, 115-n) of the system (100) requests to write data to the system (100) with a write request (605). The write request (605) is received by the master controller (125).

The master controller (125) may send a write request (620) to the write shielding cache (120). As depicted in FIG. 5, the result was a write miss (625). This may indicate that no cache line within the write shielding cache (120) contained data that was to overwritten or updated with the data defined in the original write request (605). The master controller (125) may then send a write request (630) to the memory device (110). This request (630) may further indicate that the data being whiten is undergoing a write process and is not available during the process.

A read request (635) may first be forwarded onto the memory device (110) via the in-flight memory request table (130). The read request (635) is sent in order to determine the current count data of the memory line to which the data of the original write request (605) is to be written to. This data (640) is sent onto an increment write counter (645). As discussed above, the increment write counter may first determine if a threshold maximum number of write counts has been reached for that memory line. In FIG. 6, the increment write counter (645) has determined that the threshold maximum number of write counts has not been reached for that memory line and has sent a write request (650) to the memory device (110). Pursuant to the write request (650), the data of the original write request (605) is written to the memory device (110). It should be noted that the increment write counter (645) may, in some examples, determine that the maximum number of write counts has been reached for that memory line and proceed to replace the memory line to which the data was going to be written to with a new memory line from a spare line pool.

After the data has been written, the system (100) may return to the processor (115-1, 115-2, 115-n) an indication (655) that the memory has been written to the memory device (110) and the data is free once again. The processor (115-1, 115-2, 115-n) is provided this data (655).

FIG. 7 is a data flow diagram of the system (100) depicted in FIG. 1 showing another write request data flow within the system (100) according to one example of the principles described herein. Here, at least one of the processors (115-1, 115-2, 115-n) of the system (100) requests to write data to the system (100) with a write request (705). The write request (705) is received by the master controller (125).

The master controller (125) may also send a write request (720) to the write shielding cache (120). As depicted in FIG. 7, the result was a write miss (725). This may indicate that no cache line within the write shielding cache (120) contained data that was to overwritten or updated with the data defined in the original write request (705). The master controller (125) may then send a write request (730) to the write shielding cache (120). This request (730) may indicate that the write shielding cache (120) either has an empty cache line to which the system (100) may write the data to or may indicate that the write shielding cache (120) is implementing a Least Recently Used (LRU) replacement policy. The Least Recently Used (LRU) replacement policy may evict the data within a cache line and send that data to the memory device (110) and proceed with a similar procedure described in FIG. 6 at 630-660.

After writing the data to the write shielding cache (120), the system (100) sends a notification (735) to the processor (115-1, 115-2, 115-n) that the data has been written. This way, the write shielding cache (120) may server as a buffer between the processors (115-1, 115-2, 115-n) and the memory devise (110). Consequently, the write shielding cache (120) may prevent a number of write requests from reaching the memory device (110) where certain memory lines may be prematurely degraded due to a relatively higher number of write requests.

The present specification further discloses a computer program product for shielding a memory device from high write rates comprising a computer readable storage memory having computer usable program code embodied therewith. The computer usable program code may comprise computer usable program code to, when executed by a processor, receive instructions to write data at a memory controller in which the memory controller comprises a cache comprising a number of cache lines defining stored data. The computer usable program code may further comprise computer usable program code to, when executed by a processor, update a cache line in response to a write hit in the cache with the memory controller. The computer usable program code may further comprise computer usable program code to, when executed by a processor, execute the instruction to write data in response to a cache miss to a cache line within the cache with the memory controller. The computer usable program code may further comprise computer usable program code to, when executed by a processor, prioritize for writing to the cache over writing to the memory device.

The computer usable program code may further comprise computer usable program coda to, when executed by a processor, receive instructions to write data to a line of memory in the memory device, read data defining the number of times data has been written to the line of memory, and determine if a predetermined maximum threshold of write times been exceeded. The computer usable program code may further comprise computer usable program code to, when executed by a processor, increment a counter value and write data to a memory line of the memory device (110) when the predetermined maximum threshold of write times has not been exceeded. The computer usable program code may further comprise computer usable program code to, when executed by a processor, remove a new line from a spare pool line in the memory device and enter the address of the spare line and redirection flag into the initial line when the predetermined maximum threshold of write times has been exceeded.

Various mitigation techniques were analyzed using specific design information and a trace based simulator developed to analyze the effectiveness of the mitigation techniques on commercial benchmarking workloads. If, for example, each memory controller hosts at least 32 GB of main memory, provides 50 GB/s of bandwidth, supports a maximum of 390 million cache line writes per second, and is part of a processor with 16 cores and a cache miss latency of 50 ns the following fable shows bow well the mitigation techniques described in the present application works with a memristive device with a number of device endurance levels.

| Device | Life Time With No Mitigation | Proposed solution for a 10 Year Lifetime | Capacity Overhead | WSC Size and Power Consumed[1] | Performance Impact | | Endurance |
|---|---|---|---|---|---|---|---|
| | | | | | TPC-C[2] | bcopy | Virus |
| $10^9$ | 1 min | 100 entry WSC, In-Memory Write Counters, 8 GB of Spare Cache Lines | ~38% | 6.4 KB 300 mW | <1% slower | ~25% Slower[3] | Attack 100 lines |
| $10^{11}$ | 1.1 hours | 100 entry WSC, In-Memory Write Counters, 80 MB of Spare Cache Lines | ~10% | 6.4 KB 300 mW | <1% slower | ~25% Slower | Attack 100 lines |
| $10^{13}$ | 4.6 days | 1000 entry WSC, No In-Memory Write Counters, No Spare Cache Lines | ~0% | 64 KB 3 Watts[4] | None | None | Attack 1K lines |
| $10^{16}$ | 13 years | No Mitigation | N/A | N/A | N/A | N/A | N/A |

[1]40 nm, high performance ASIC process assumed.
[2]Transaction Processor Council Benchmark C (TPC-C) Analysis was done with traces from taken on an 8 core server.
[3]System write operations require memristor read-modify-write sequences.
[4]A highly associative cache will require significantly more control logic.

The specification and figures describe a system and method of shielding a memory device from high write rates. The system may comprise a write shielding cache in a memory controller in which the memory controller prioritizes for writing to the cache over writing to a memory device associated with the memory device (110). This system and method of shielding a memory device may have a number of advantages, including providing a system that reduces the number of times a memory device is written to thereby preventing degradation of the memory device. The system also provides for a simpler and quicker method of reading information from the system when a processor requests to read data.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method comprising:
receiving instructions to write a data line at a memory controller, the memory controller comprising a cache comprising a number of cache lines defining stored data and associated write counters;
with the memory controller, in response to a cache hit, updating a corresponding cache line with the data line; and
with the memory controller, in response to a cache miss,
retrieving the associated write counter for the data line from a memory device,
writing a lowest write count data line to the memory device, lowest write count data line being selected from the data lines stored in the cache and the data line from the instructions,
incrementing the associated write counter of the lowest write count data line, and
if the lowest write count data line is not the data line from the instructions, writing the data line from the instructions to the cache line previously occupied by the least written to data line.

2. The method of claim 1, in which the memory device is a memristive device.

3. The method of claim 1, in which the cache implements a write-back policy.

4. The method of claim 1, in which the memory device comprises a number of data lines separated into spare lines and initial lines and in which the method further comprises:
receiving instructions to write data to an initial line of memory in the memory device;
reading data defining a number of times data has been written to the initial line of memory; and
determining if a predetermined maximum threshold of write times has been exceeded for the initial line of memory.

5. The method of claim 4, in which, if the maximum threshold of write times has not been exceeded for the initial line of memory:
updating a counter value associated with the initial line of memory incrementally; and
writing data to the initial line of memory.

6. The method of claim 4, in which if the maximum threshold of write times has been exceeded for the initial line of memory:
selecting a spare line; and
storing an address of the spare peel line and a redirection flag into the initial line of memory.

7. The method of claim 1, further comprising selecting the lowest write count data line by retrieving the write counts for each cache line from the cache and comparing the write counts retrieved from the cache and the write count retrieved from the memory device.

8. A system, comprising:
a memory controller;
a memory device communicatively coupled to the memory controller;
a write shielding cache communicatively coupled to the memory controller and memory device;
in which the memory controller is to:
receive a write request comprising a data line;
in response to a cache hit in the write shielding cache, update a cache line in the write shielding cache;
in response to a cache miss in the write shielding cache,
retrieve an associated write counter for the data line from the memory device,
select a lowest write count data line from the data lines stored in the cache and the data line from the request by comparing write counters of the data lines,
write the lowest write count data line to the memory device, and
if the lowest write count data line is not the data line from the request, writing the data line from the request to the cache line previously occupied by the least written to data line.

9. The system of claim 8 in which the memory controller is to write the lowest write count data line to the memory device by:
and
determining if the write counter for the lowest write count data line exceeds a predetermined maximum threshold.

10. The system of claim 9, in which the memory controller is to:
if the write counter for the lowest write count data line does not exceed the maximum threshold:
update a counter value associated with the line of memory incrementally; and
write data to the memory line; and
if the write counter for the lowest write count data line does exceed the maximum threshold:
select a new line from a pool of spare lines in the memory device; and
store an address of the new line and a redirection flag at the initial line for lowest write count data line.

11. A method of shielding a memory device from high write rates comprising:
receiving instructions to write data at a memory controller, the memory controller comprising a cache comprising a number of cache lines defining stored data;
with the memory controller, updating a cache line in response to a write hit in the cache; and
with the memory controller, executing the instruction to write data in response to a cache miss to a cache line within the cache;
in which the memory controller prioritizes for writing to the cache over writing to the memory device,
in which the memory device comprises a number of data lines separated into spare lines and initial lines and in which the method further comprises:
receiving instructions to write data to an initial line of memory in the memory device;
reading data defining a number of times data has been written to the initial line of memory;
determining if a predetermined maximum threshold of write times has been exceeded for the initial line of memory;
in which if the maximum threshold of write times has been exceeded for the initial line of memory:
removing a line from a spare pool line in the memory; and
entering in an address of the spare pool line and a redirection flag into the line of memory.

* * * * *